United States Patent Office 2,998,103
Patented Aug. 29, 1961

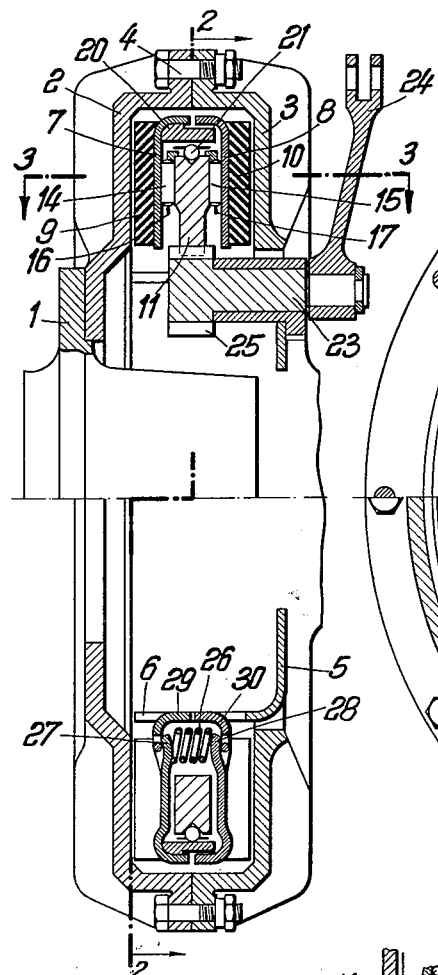
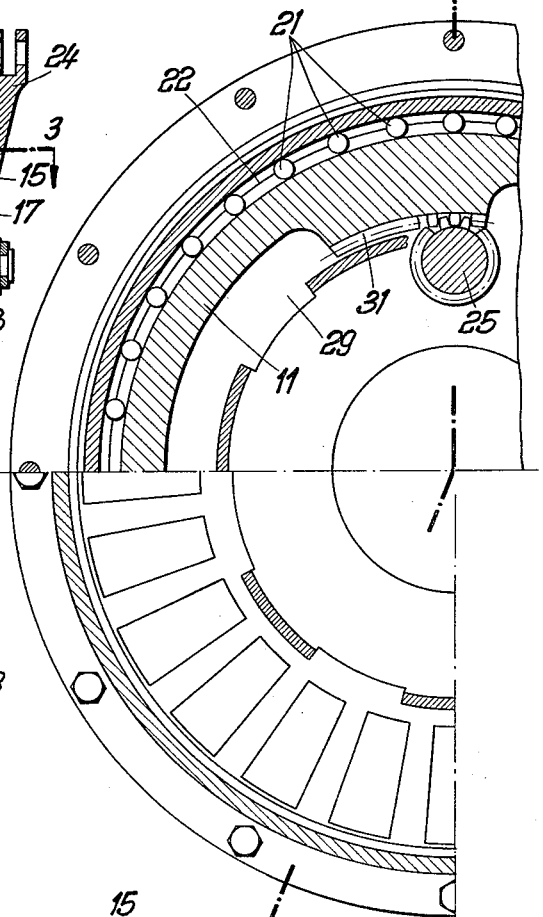
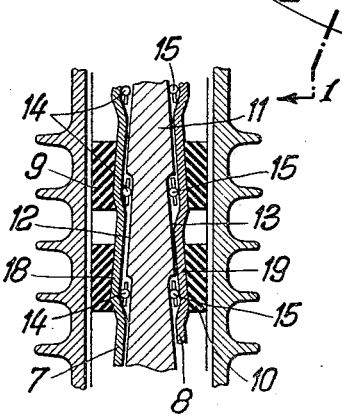

2,998,103
NON-BOOSTED DISC BRAKE, MORE PARTICULARLY FOR MOTOR VEHICLES
Hermann Klaue, Christophstr. 19, Überlingen (Bodensee), Germany
Filed Mar. 24, 1959, Ser. No. 801,635
Claims priority, application Germany Dec. 24, 1958
3 Claims. (Cl. 188—72)

Non-boosted disc brakes are known wherein, in a rotating brake housing, there are arranged two brake discs which are displaceable axially on the brake carrier but are not rotatable in the peripheral direction. These brake discs are connected to one another through the agency of rolling coupling elements mounted in recesses inclined in the peripheral direction and through the agency of a brake operating ring situated co-axially to the brake discs, rotation of the said ring resulting in pressing the brake discs against the inner surfaces of the rotating brake housing.

The invention relates to disc brakes of the kind specified. The object of the invention is to develop these disc brakes further in the sense of giving them a considerably narrower construction and reducing the specific pressure of the rolling coupling elements, so that no parts which have to be hardened and ground need be used in the production of the brake discs and the operating ring.

The solution of this problem according to the invention consists in that the coupling elements between the brake disc recesses inclined in the peripheral direction and the recesses in the symmetrically shaped, ball-centered operating ring are rollers or needles instead of—as conventional hitherto—balls. The use of rollers or needles substantially reduces the specific pressure with which the application force is transmitted, so that the brake discs can be made from stamped sheet metal, the inclined tracks for the rollers or needles being stamped in the discs at the time of production. The brake operating ring can be produced by impact extrusion. The tracks on this operating ring for the ball centering arrangement can also be produced without cutting.

One example of embodiment of the invention is illustrated in the accompanying drawings in which:

FIGURE 1 is a cross-section through the axis of the mechanically operated brake, along the line 1—1 of FIGURE 2;

FIGURE 2 is a partly fragmentary sectional view of the brake at right angles to its axis, along the line 2—2 of FIGURE 1, and FIGURE 3 is a part sectional view of the brake discs, the brake lining and the brake operating ring, along the line 3—3 of FIGURE 1.

The rotating parts of the brake consist of the brake housing 2 which is bolted to the hub 1 and which is closed by a brake cover 3. The two parts are provided with radial ribs for strength reasons and in order to dissipate heat more effectively. The brake housing 2 and the brake cover 3 are connected together by bolts 4. The two brake discs 7 and 8, each of which carries a brake lining 9 and 10 respectively on its outer side, are arranged in recesses 6 of the brake carrier 5 which is connected to the axle.

Situated between the brake discs 7 and 8 and co-axially thereto is the brake operating ring 11 which comprises at both sides tracks 12 and 13 inclined in the peripheral direction. Needles 14 and 15 connected to one another in each case by a cage 16 and 17 respectively are mounted on these tracks. The brake discs 7 and 8 which are preferably stamped from sheet metal comprise, at the places where the needles 14 and 15 are situated, tracks 18 and 19 which are inclined in the peripheral direction. In the illustrated example of embodiment, the brake operating ring is centered on the brake disc 7 by anti-friction members such as caged balls 21, through the agency of the centering ring 20. The brake operating ring 11 bears by means of a row of balls 21 connected together by a cage 22. The centering ring 20 could, of course, also be centered on both brake discs.

The shaft 23 on which a lever 24 is fixed externally and which is provided internally with a toothed wheel 25, is the actuating means used for rotating the brake operating ring 11 in the peripheral direction. Meshing with the toothed wheel 25 is a toothed segment 31 which expediently is made in one piece with the brake operating ring 11. The brake operating lever must also be provided externally with a restoring spring which pulls the said lever back into its initial position after operation of the brake. Since, in the case of compressed air actuation, this restoring spring is arranged in any case in the brake cylinder, it is not illustrated in the drawings. The brake discs 7 and 8 are returned to their initial positions by restoring springs 26 which are suspended in stamped projections 27 and 28 of the brake discs 7 and 8, as FIGURE 1 shows. Torque is transmitted from the brake discs 7 and 8 to the brake carrier 5 by projections 29 and 30 which project into corresponding recesses in the brake carrier 5.

I claim:

1. In a non-boosted disc brake, for use in connection with a vehicle having a non-rotating axle and a brake housing rotating relative to said axle and a brake carrier connected to said axle, the combination of two brake discs axially displaceable on said carrier and connected to the brake carrier and held thereby non-rotatable in the peripheral direction, a symmetrically shaped brake operating ring located co-axially between the brake discs, peripherally inclined recesses defined in the adjacent faces of the brake discs and the brake operating ring inclined substantially parallel, needle rollers interposed in said recesses between the faces of said brake discs and said brake operating ring, actuating means operable to rotate the brake operating ring serving to press the brake discs against the inner surfaces of the rotating brake housing through the agency of said rollers, and centering means interposed in rolling friction engagement between at least one of said discs and said operating ring and operable to center said operating ring relative to said disc.

2. In a non-boosted disc brake, as claimed in claim 1, said centering means including balls and a cage for said balls, said operating ring having an encircling groove which said balls are in rolling contact with.

3. In a non-boosted disc brake, for use in connection with a vehicle having a non-rotating axle and a brake housing revoluble relative to said axle and a brake carrier connected to said axle, the combination of two brake discs mounted on said brake carrier and axially displaceable on said carrier but restrained by said carrier to be non-rotatable in the peripheral direction, a symmetrically shaped brake operating ring having an encircling groove and disposed coaxially between the brake discs, a centering ring connected to at least one of said brake discs and encircling said operating ring, antifriction members circumferentially engaging said groove and interposed between said operating and centering rings, peripherally inclined recesses defined in the adjacent faces of the brake discs and the brake operating ring inclined substantially parallel, and needle rollers disposed in said recesses, rotation of the brake operating ring serving to press the non-rotating brake discs against the inner surfaces of the rotating brake housing through the agency of said rollers.

References Cited in the file of this patent
UNITED STATES PATENTS

| | | |
|---|---|---|
| 1,875,434 | Frankland | Sept. 6, 1932 |
| 2,057,422 | Dickson | Oct. 13, 1936 |
| 2,329,097 | Ash | Sept. 7, 1943 |